May 18, 1937.                I. J. HUSSEY                2,080,405
                            FURNACE BAFFLE
                          Filed July 3, 1935
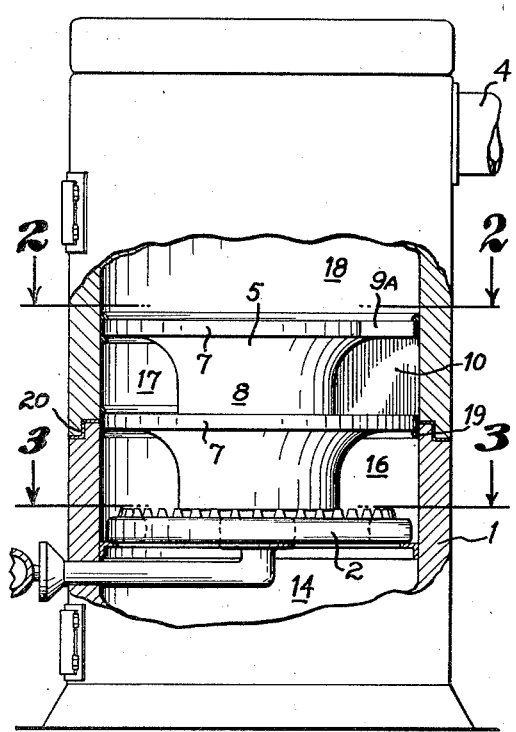
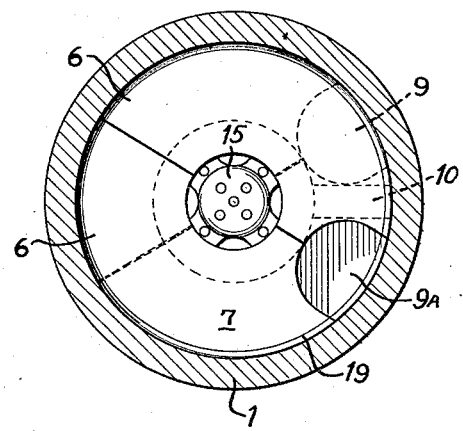
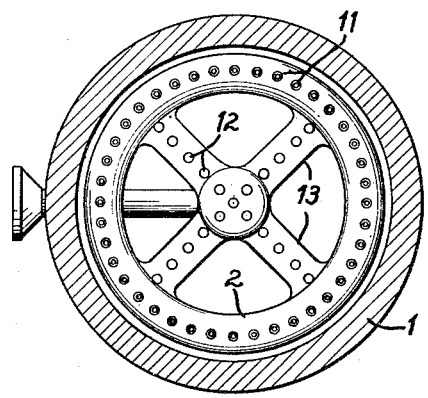
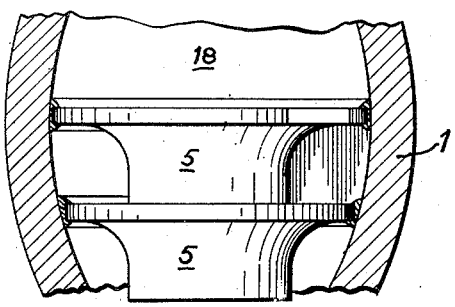
INVENTOR,
IRVING J. HUSSEY.
BY
Lippincott & Metcalf
ATTORNEYS.

Patented May 18, 1937

2,080,405

UNITED STATES PATENT OFFICE 2,080,405

FURNACE BAFFLE

Irving J. Hussey, San Francisco, Calif.

Application July 3, 1935, Serial No. 29,663

2 Claims. (Cl. 110—97)

My invention relates to furnaces; and more particularly, to a flame spreader or baffle to be used in conjunction with the combustion chamber of furnaces and is more especially adapted for use in the conversion of coal or wood burning heating units to gas or oil heat.

Among the objects of my invention are: To provide a refractory baffle for a combustion chamber; to provide a baffle to be used in conjunction with conversion burners; to provide a baffle for furnace combustion chambers which will direct heating flames in a circuitous path therethrough; to provide a conversion burner baffle for furnaces which increases the efficiency of the combustion chamber in which it is installed; to provide a furnace baffle which is in units and which can be inserted in such a manner as to increase the efficiency of combustion chambers of various heights; and to provide a simple and efficient baffle for a furnace combustion chamber.

Other objects of my invention will be apparent or will be specifically pointed out in the description forming a part of this specification, but I do not limit myself to the embodiment of the invention herein described, as various forms may be adopted within the scope of the claims.

Referring to the drawing:

Figure 1 is a diagrammatic representation of a preferred form of baffle of my invention installed in a combustion chamber.

Figure 2 is a top plan view of the baffle as installed, taken as indicated by the line 2—2 in Figure 1.

Figure 3 is a top plan view of a preferred form of burner for use with my baffle, taken on the plane as indicated by the line 3—3 in Figure 1.

Figure 4 is a view partly in section and partly in elevation showing the baffle of my invention as applied to a combustion chamber having a varying diameter.

Other broad aspects of my invention can be more readily understood by direct reference to the drawing, wherein the fire-box wall 1 is provided with a conversion burner 2, preferably of the ring type, in order to adapt the furnace for gas heat. In the drawing representing the furnace, I have chosen to illustrate only the combustion chamber wall, as it is obvious that the invention as described may be applied to various types of furnaces whether hot water, steam, hot air, or any other type, wherein a solid fuel combustion chamber has formerly been used.

In installations of this sort, the grates are usually removed and the gas burner 2 is installed at the level of the grate. In most instances, this is all the provision that is made for heating the furnace, and it is obvious that in many cases a large percentage of the heat will pass directly out of the flue 4 without having been used to heat the walls of the combustion chamber. Occasionally, however, heat spreaders are used directly above the burner to direct the heat against the combustion chamber walls in the vicinity of the burner, but even then, a large amount of heat is wasted.

I prefer, therefore, to utilize a baffle which will direct the heated gases in a spiral path around the interior of the combustion chamber so that they will remain in contact with the furnace walls a sufficiently long time to give up a large percentage of their heat thereto. I have therefore provided a baffle assembly which comprises a series of refractory baffle members 5 of uniform construction and so designed that they may be placed one above the other and resting on each other, to fill the combustion chamber to such an extent that maximum heat transfer may be obtained.

Each baffle member 5 is preferably made in halves 6—6 when molded, for ease of insertion into the combustion chamber, and the complete baffle comprises horizontal platform 7 and a hollow standard 8. Each baffle member is also provided with an outlet aperture 9 and a partition 10 although in many instances, I prefer to omit the partition 10 in the baffle member which is positioned immediately adjacent the ring burner. In some instances, however, and with some burners, I may prefer to utilize the partition even on the first baffle member.

The first baffle member is placed directly on the burner and, I prefer to utilize a ring type burner wherein the outer burner holes 11 are utilized for the production of the flames whereas inner bosses 12 are not perforated, and serve to raise the base of the first baffle slightly above the level of the burner arms 13 to allow entrance of air from the ash pit 14 into the hollow center 15 of the baffle assembly.

The second baffle is positioned on top of the first in such a manner that the partition 10 is at one side of the aperture 9 of the first baffle member so that the partition requires the gases from the flame chamber 16 to travel almost a complete circle around the baffle before they pass into the second heat chamber 17 and from thence out into the main chamber 18 through opening 9A in the upper baffle.

If desired, additional baffle members may be added until the combustion chamber is deemed sufficiently full to utilize as far as possible all the heat generated by the burner 2. In many instances, I have found it desirable to make the platform 7 of almost the same diameter as the interior of the combustion chamber and then utilize a quantity of cement 19, to seal chamber 16 from chamber 18.

Furthermore, in many cases, the combustion chamber wall is provided with joints 20 and if so, and when practical, I prefer to position each baffle member so that the edge of the horizontal platform 7 will be on the same level as the joint 20, cement 19 therefore strengthening the cemented joint by providing an additional seal against escaping combustion fumes or gases.

In the embodiment shown in Figure 4, I have shown baffle members of differing diameters, the use of which provides an extended path for the hot gases in furnaces of the barrel type.

While I prefer to utilize baffle members having a hollow center so the draft from the combustion chamber may pass through the baffles, it may be desirable in some cases that this feature be omitted, in which case, the hollow center 15 may either be plugged or the baffle members themselves made solid.

I have found that the application of the baffle of my invention has greatly increased the efficiency of conversion installations.

I claim:

1. In combination with a furnace having a combustion chamber and means for producing a flame adjacent the bottom of said chamber, a plurality of spaced refractory baffles stacked above said flame, each of said baffles having a horizontal partition extending to the side walls of said combustion chamber, and thereby dividing said combustion chamber into separate auxiliary chambers and each having an opening in said partition to allow passage of gases therethrough, the openings in adjacent baffles being offset to cause said gases to circulate within said auxiliary chambers during passage of said gases through said combustion chamber, and a vertical partition extending along a radius of each baffle for preventing more than one traversal of each chamber by said gases.

2. In combination with a furnace having a combustion chamber and means for producing a flame adjacent the bottom of the combustion chamber, a plurality of baffles of refractory material stacked above said flame, each baffle having a central core spacing said baffles and a horizontal partition extending to the side walls of said combustion chamber, and thereby dividing said fire-box into separate auxiliary chambers, each baffle having an opening in said partition to allow passage of gases therethrough, the openings in adjacent baffles being offset to cause said gases to circulate within said auxiliary chambers, and a vertical partition extending from the core of each baffle to the combustion chamber wall to limit circulation of gases to one traversal of each auxiliary chamber, said central core being hollow to form a continuous passage through all of said baffles and open to said combustion chamber below said flame and on top of said stack.

IRVING J. HUSSEY.